(12) United States Patent  
Fargason

(10) Patent No.: US 6,668,749 B2
(45) Date of Patent: Dec. 30, 2003

(54) HUNTING ACCESSORY

(76) Inventor: William H. Fargason, P.O. Box 36635, Birmingham, AL (US) 35236

( * ) Notice: Subject to any disclaimer, the term of this patent is extended or adjusted under 35 U.S.C. 154(b) by 22 days.

(21) Appl. No.: 10/059,352

(22) Filed: Jan. 31, 2002

(65) Prior Publication Data

US 2003/0140956 A1 Jul. 31, 2003

(51) Int. Cl.[7] ............................................... B63B 35/00
(52) U.S. Cl. ........................ 114/351; 114/353; 135/901
(58) Field of Search ................................ 114/351, 349, 114/353; 43/1; 135/901, 95

(56) References Cited

U.S. PATENT DOCUMENTS

| 1,651,785 | A |   | 12/1927 | Ulrich |        |
|-----------|---|---|---------|--------|--------|
| 3,045,262 | A |   | 7/1962  | Mitchell |      |
| 3,638,257 | A |   | 2/1972  | Ernst  |        |
| 4,070,722 | A |   | 1/1978  | Sutherland |    |
| 4,106,145 | A |   | 8/1978  | Gillen et al. | |
| 4,123,869 | A |   | 11/1978 | Witt   |        |
| 4,183,110 | A | * | 1/1980  | Kidd et al. ............... 5/629 |
| 4,239,247 | A | * | 12/1980 | Hinz ....................... 280/19.1 |
| 4,581,837 | A |   | 4/1986  | Powlus |        |
| 4,585,020 | A | * | 4/1986  | Masuda et al. ............. 135/95 |
| 4,683,672 | A | * | 8/1987  | Davis ........................... 43/1 |
| 4,716,919 | A |   | 1/1988  | Griffin |       |
| 4,751,936 | A |   | 6/1988  | Zibble et al. | |
| 4,798,019 | A |   | 1/1989  | Sury et al. | |
| 4,825,799 | A |   | 5/1989  | Bergeron et al. | |
| 4,979,456 | A |   | 12/1990 | Steward |      |
| 5,339,852 | A |   | 8/1994  | Bull   |        |
| 5,450,809 | A | * | 9/1995  | Melton ..................... 114/353 |
| 5,458,079 | A |   | 10/1995 | Matthews et al. | |
| 5,615,633 | A |   | 4/1997  | Cripe  |        |
| D379,961  | S |   | 6/1997  | Cripe  |        |
| 5,647,159 | A |   | 7/1997  | Latschaw |     |
| D391,617  | S |   | 3/1998  | Hill   |        |
| D392,935  | S |   | 3/1998  | Cripe  |        |
| 5,822,906 | A | * | 10/1998 | Ward ............................ 43/1 |
| 6,016,823 | A |   | 1/2000  | Hill   |        |

* cited by examiner

Primary Examiner—Sherman Basinger
(74) Attorney, Agent, or Firm—Richard C. Litman

(57) ABSTRACT

A hunting accessory comprises a pair of essentially identical shells which are removably attachable to one another by hinges. At least one shell comprises an unbroken, continuous, waterproof hull useful as the lower portion of a blind in water or marshy areas. A second shell may include a separate openable portion with viewing openings disposed over the hunter's head and upper body when the assembly is used as a blind with a supine hunter concealed therein. The smaller portion is opened when the hunter has a shot at game in the vicinity. The device may also be used for the carriage of hunting equipment, and/or is useful as a closed container for containing and hauling loose materials (leaves, etc.) in an open vehicle. The two shells may be separated from one another, with one of the shells being useful as a game drag or the like.

18 Claims, 5 Drawing Sheets

HUNTING ACCESSORY

BACKGROUND OF THE INVENTION

1. Field of the Invention

The present invention relates generally to hunting equipment and accessories, and more specifically to an unpowered conveyance or shell which is easily towed or transported to a hunting site for use as a blind, and/or which may be used as a game drag, equipment or material hauling device, etc., as desired.

2. Description of the Related Art

Hunters, wildlife photographers, and others interested in the outdoors and wildlife, have long recognized the need for suitable camouflage and concealment when attempting to approach wild animals closely. This is particularly true of hunters, who must approach their quarry relatively closely in most cases, as they do not have the luxury of a telephoto lens. Hunters of wildfowl (e.g., ducks, geese, etc.) can find it particularly difficult to get within gun range of their quarry (or to attract the game within gun range), due to the relatively short range of the shotgun universally used in such hunting. As a result, hunters have developed various means of concealing themselves from game, and/or attracting the game with decoys, bird calls, etc.

In waterfowl hunting, a hunter often uses a small boat (skiff, etc.) having a shallow draft, and may conceal the boat with natural or synthetic plant materials as camouflage. While such a boat has other uses, its use in hunting is relatively limited due to its size, the relatively open configuration of the upper portion of the boat, and its weight and bulk which preclude unpowered movement over land areas. The hunter using a boat must also have a boat trailer, as well as having a significant amount of camouflage material to conceal the boat.

The hunter who is interested in larger game, must provide even further equipment. The deer (or elk, etc.) hunter who kills his game at some remote site, is faced with the problem of hauling the game back out to a roadway, or to some site which is accessible to a motorized vehicle so he may haul the game away. While many different game totes and carriers have been developed in the past, they are generally configured specifically for such purpose, and cannot be used for other purposes (e.g., waterfowl blinds, etc.).

Thus, the hunter who wishes to hunt different types of game is faced with the need for perhaps several relatively costly, bulky, and cumbersome pieces of equipment necessary to facilitate the hunt, depending upon the specific game being hunted. The hunter is also generally faced with the need to haul other equipment (a weapon, possibly a tree stand for larger game, etc.) as well. The resulting need for specialized and perhaps somewhat costly equipment, which may be limited in utility for other purposes, can be discouraging to even the most dedicated hunter.

Accordingly, a need will be seen for a versatile hunting accessory which fulfills all of the above needs in a single piece of equipment. The present hunting accessory comprises a pair of relatively small, light weight, rigid shells formed of a high density polyethylene plastic or other suitable material. The two shells are hinged together to form an enclosure, with the hunter being at least partially or completely concealed (as desired) therein. The device may be concealed further by means of conventional natural or synthetic camouflage material. The present accessory provides further versatility by means of its buoyancy, enabling the device to be towed, paddled, or otherwise propelled across water and/or marshy surfaces to appropriate hunting sites.

The interior of the device serves well for the carriage of hunting equipment therein (decoys, weapons and ammunition, camouflage materials, etc.). Moreover, the two main shells of the present hunting accessory may be easily separated from one another, and a single shell used as a game tote or the like for larger game animals. The interior may be fitted with a removable cushion(s), but the durable nature of the material used enables the device to be used for other purposes as well upon removal of any cushioning or other articles from the interior. For example, the present accessory also serves well as a container or carrier for landscaping materials, yard waste, etc., as desired, and the ability of the two shells to be secured together provides for the carriage of loose material (leaves, etc.) in the back of an open vehicle, without loss of materials during travel.

A discussion of the related art of which the present inventor is aware, and its differences and distinctions from the present invention, is presented below.

U.S. Pat. No. 1,651,785 issued on Dec. 6, 1927 to Charles B. Ulrich, titled "Hunting Boat," describes a small, light weight skiff or the like having a rudder and hand operated propeller. The rudder and propeller protruding from the bottom of the boat preclude its use as a game drag over a solid or semi-solid surface, as provided by the present device. Moreover, the Ulrich boat is essentially enclosed over its upper surface by a pair of doors, thus precluding its use in carrying large, heavy, and/or bulky cargo, other than a hunter who positions himself within the boat. The Ulrich boat does not lend itself to the assembly of two identical hulls with one inverted atop the other to form a hunting blind or other enclosure, as provided by the present invention.

U.S. Pat. No. 3,045,262 issued on Jul. 24, 1962 to Robert P. Mitchell, titled "Skin Diver's Combined Float And Equipment Carrier," describes a compartmented hull having a buoyant flotation chamber at each end with a porous compartment in the center. The porous center compartment has a perforated floor to allow water to flow therethrough to keep a catch of fish fresh while the device is in the water. The Mitchell carrier is relatively small, and includes a pair of back straps extending across the floor or base thereof for carriage of the device. This, along with the porous floor, precludes use of the device as a game drag, and the central porous compartment cannot be used to support a hunter therein.

U.S. Pat. No. 3,638,257 issued on Feb. 1, 1972 to Carl J. Ernst, titled "Hunting Boat," describes a small skiff or kayak type boat having a very low gunwale, in the manner of the Ulrich boat discussed further above. The low height above the water requires a substantially closed upper deck. The Ernst boat is so small and low that additional superstructure must be provided for foot clearance for a hunter reclining in the boat. As a result, one cannot take two hulls of the Ernst configuration and assemble them in mirror image atop one another to provide a complete enclosure for a hunter or other person, as is possible with the present hunting accessory. As in the case of the Ulrich boat, the small opening in the Ernst boat superstructure precludes its use as a game tote for larger animals or other large, bulky articles.

U.S. Pat. No. 4,070,722 issued on Jan. 31, 1978 to Johnny L. Sutherland, titled "Hunting Blind Boat Cover," describes a frame and covering structure for removable installation to an existing open boat hull. Sutherland provides an openable top hatch for his cover, but the configuration of the Sutherland cover precludes use as a flotation device per se, as can be achieved using the present hunting accessory.

U.S. Pat. No. 4,106,145 issued on Aug. 15, 1978 to John E. Gillen et al., titled "Boat Mounted Game Blind," describes a folding, convertible type top for installation on a skiff, kayak, or similar small boat. The Gillen et al. cover is not rigid, cannot provide flotation per se, and cannot be attached to a similar cover to provide an enclosure, as can the present invention.

U.S. Pat. No. 4,123,869 issued on Nov. 7, 1978 to Gordon Witt, titled "Goose And Duck Blind," describes a series of rectangular three dimensional shells which secure removably together to form an enclosure. While the various layers or tiers may be hingedly opened relative to one another, no means is provided for assembling two of the assemblies together in mirror image along their mutual edges, to form an essentially completely enclosed space, as can the present invention. The rectangular configuration of the Witt structure cannot serve as a game drag or similar device for towing or dragging over a hard, soft, or marshy surface or across a body of water, as provided by the present invention.

U.S. Pat. No. 4,581,837 issued on Apr. 15, 1986 to Joe Powlus, titled "Hunter's Blind," describes a "Trojan Horse" type blind, having the configuration of a very large goose with sufficient internal volume to conceal a hunter therein. The patentee states that geese cannot determine the relative size of another animal, and are attracted to the general configuration regardless of its size. In any event, the Powlus blind cannot be provided as two shells with one inverted to form a mirror image pair, due to its goose-like configuration. Moreover, the Powlus blind teaches away from the present structure with its provision for the addition of external camouflage thereto, as Powlus would not wish to conceal his blind, but rather to display its goose-like appearance to attract wild geese. Also, Powlus does not provide any means for using his blind as a game drag or tote.

U.S. Pat. No. 4,716,919 issued on Jan. 5, 1988 to Dennis M. Griffin, titled "Portable Blind With Automatic Opening Top," describes a generally rectangular frame with a folding top frame, somewhat like a conventional convertible automobile top. The frames are covered with camouflage fabric material. The top frame is secured by bungee cords or the like and quick release latches at each side, whereby the top springs open quickly when the latches are released on one side. The Griffin structure is not buoyant, cannot be assembled as a mirror image pair to provide a rigid enclosure, and cannot be used as a game drag, which functions and structure are each a part of the present invention.

U.S. Pat. No. 4,751,936 issued on Jun. 21, 1988 to Thomas L. Zibble et al., titled "Portable Field Blind," describes a light weight frame with a pivotally folding top frame, each covered b camouflage material. No floor is provided; the hunter reclines in a supine position on a ground cloth spread beneath the device. The top opens in much the same manner as that of the tops of the blinds of the Gillen et al. '145 and Griffin '919 U.S. patents, discussed further above. No buoyancy is provided for the Zibble et al. blind, nor do Zibble et al. provide any means for using their blind as a game tote, as provided by the present hunting accessory.

U.S. Pat. No. 4,798,019 issued on Jan. 17, 1989 to Patty A. Sury et al., titled "Portable Blind," describes a rectangular structure having a fabric covered frame. The rigid top frame may be swung open to either side, but no buoyancy or means are provided for assembling two such structures in mirror image to one another.

U.S. Pat. No. 4,825,799 issued on May 2, 1989 to Robert Bergeron et al., titled "Floating Duck Blind," describes a "sink box" type float comprising a relatively wide, flat flotation sheet which folds longitudinally, with an opening therein for a "tub" or well in which the hunter resides during the hunt. While a portion of the device may be covered with a quickly openable panel, the upper portion and head of the hunter are normally exposed. Bergeron et al. do not provide any means for inverting a second one of their floats atop a first one in mirror image fashion to form a completely closed structure, as provided by the present invention. Moreover, the protruding tub or well does not provide the smooth surface necessary for use as a game drag, as provided by the present hunting accessory invention.

U.S. Pat. No. 4,979,456 issued on Dec. 25, 1990 to Leon D. Steward, titled "Portable Blind," describes a gabled framework comprising three separate units which attach to the gunwales and extend across an existing open boat. The frames are covered with fabric camouflage panels. The Steward blind thus more closely resembles the blind structure of the Griffin '919 U.S. patent, discussed further above, than it does the present invention with its two essentially identical rigid shells. The Steward blind clearly is not waterproof to provide flotation without an existing boat and does not provide the structural strength and rigidity required for use as a game drag, which features are provided by the present hunting accessory invention.

U.S. Pat. No. 5,339,852 issued on Aug. 23, 1994 to Danny C. Bull, titled "Permanent Portable Weatherproof Blind," describe a semicylindrical shell installed over the box of a pickup truck. The device is intended to resemble a large roll of hay, although no such camouflage is disclosed. One side of the shell is pivoted a each end thereof, and may be rolled open for a hunter therewithin to shoot. The Bull blind is not formed in two identical halves and is not at all suitable for use as a game drag due to its size. The Bull blind more closely resembles the blind of the Sutherland '722 U.S. patent, than it does the present hunting accessory invention.

U.S. Pat. No. 5,458,079 issued on Oct. 17, 1995 to Thomas B. J. Matthews et al., titled "Portable Blind," describes framework which is installed over an open boat, with a fabric camouflage cover. No buoyancy per se is provided, nor is the device suitable for use as a game drag. The Matthews et al. blind more closely resembles the blinds of the Griffin '919 and Steward '456 U.S. patents discussed further above, than it does the present invention.

U.S. Pat. No. 5,615,633 issued on Apr. 1, 1997 to James A. Cripe, titled "Water Craft With Removable Duck Blind Cabin House Assembly," describes a blind having a rigid shell with an upper hatch, the assembly being removably installable over an open boat. No flotation per se is provided by the Cripe blind, due to the openable hatch assembly. The Cripe blind more closely resembles the blind of the Sutherland '722 U.S. patent, discussed further above, than it does the present hunting accessory invention.

U.S. Pat. No. 5,647,159 issued on Jul. 15, 1997 to Ronald D. Latschaw, titled "Portable Hunting Blind With Slidably Opening Top," describes a frame for placement on the ground. A rigid camouflage covering is placed over the frame. The device includes a sliding top which the hunter may open for a shot. As the Latschaw blind is adapted for installation directly upon the ground, no flotation means is provided, nor is the Latschaw blind suitable for use as a game drag. The Latschaw blind structure more closely resembles the blinds of the Sury et al. '019 and Matthews et al. '079 U.S. patents, than it does the present hunting accessory invention.

U.S. Pat. No. 6,016,823 issued on Jan. 25, 2000 to Curtis J. Hill, titled "Collapsible Bale Blind," describes a semicylindrical framework with a fabric sheet camouflage cover. The device includes a rigid sled tray, but as the tray is used for carrying the remainder of the structure when it is folded, it cannot be used as a game drag or the like, as provided by the present invention. It is also noted that the tray is much too shallow to provide buoyancy for a hunter and associated equipment. The Hill blind more closely resembles the blinds of the Griffin '919, Sury et al. '019, Steward '456, and Matthews et al. '079 U.S. patents discussed further above, than it does the present invention.

U.S. Pat. No. D-379,961 issued on Jun. 17, 1997 to James A. Cripe, titled "External Surface Of A Duck Blind Boat Cover," illustrates a design apparently having one or more openable hatches therein, and apparently serving to cover an open boat. No disclosure of rigidity is made, but even assuming the design is a rigid shell, two such shells of the Cripe design cannot be placed together in mirror image assembly to form an enclosure, due to a protrusion extending from the rear flange of the Cripe design. Moreover, the upper edges do not provide the smooth surface required for use as a game drag, as provided by the present hunting accessory invention. The design of the '961 U.S. Design patent to Cripe appears to be based upon the blind of the '633 U.S. patent to the same inventor, discussed further above.

U.S. Pat. No. D-391,617 issued on Mar. 3, 1998 to Curtis J. Hill, titled "Goose Blind," illustrates a design resembling the configuration of a live goose. No disclosure of the size of the device is apparent in the Hill design, but if the design is truly intended for use as a blind, it would have to be of sufficient size to conceal at least one hunter therein. The asymmetrical nature of the shape precludes assembly as mirror image halves to form an enclosure, as provided by the present invention. The Hill design more closely resembles the hunter's blind of the '837 U.S. patent to Powlus, discussed further above, than it does the present hunting accessory invention. The point made in the discussion of the Powlus '837 U.S. patent RE: Lack of provision for additional camouflage means, is also seen to apply here.

Finally, U.S. Pat. No. D-392,935 issued on Mar. 31, 1998 to James A. Cripe, titled "One Person Waterfowl Hunting Blind," illustrates a design which somewhat resembles a sarcophagus. The asymmetrical shape of the device precludes assembly of a similar device thereatop in mirror image to form an enclosure, as may be done with the present invention. Moreover, it appears that the Cripe design includes a lateral hinge or ridge of some sort extending across the bottom surface, which would preclude use of the Cripe '935 design as a game drag.

None of the above inventions and patents, taken either singularly or in combination, is seen to describe the instant invention as claimed. Thus a hunting accessory solving the aforementioned problems is desired.

SUMMARY OF THE INVENTION

The present invention is a hunting accessory, useful as a waterfowl or other blind, a game drag or tote, and also useful for the carriage and storage of other articles and material as well. The present hunting accessory essentially comprises a pair of essentially identical shells formed of a high density polyethylene, plastic or other suitable material. The shells have a tub-like configuration, with a size permitting an average adult to recline therein in a generally supine position. One shell may be inverted and installed atop a second shell to form an enclosure, with the assembly being covered with camouflage materials to serve as a blind for the hunter concealed therein.

In at least one embodiment, the second or upper shell may be cut laterally to form two sections, with the smaller section facilitating rapid opening for a hunter to shoot at game in the vicinity. The upper shell may also include openings or passages therethrough, for viewing and ventilation. An accessory tray or cup holder may be hingedly attached to one edge of at least the lower shell, whereby it may be deployed for use or folded with the shell for storage as desired. At least the bottom shell comprises a single, continuous, unbroken length, devoid of any laterally disposed protrusions thereon, for use as a game drag or the like. The generally smooth bottom surface of the device and its buoyancy, allow the present hunting accessory to be used for transporting a hunter, equipment, and/or killed game, etc. across hard or marshy surfaces, as well as over bodies of water. The capability of the assembly to be closed, permits the device to be used for hauling or carriage of other loose materials as well (e.g., leaves and yard waste, sand, etc.) in an open pickup truck without the contents being scattered in the wind. The device also serves well to protect the interior of a vehicle from soiling.

Accordingly, it is a principal object of the invention to provide a hunting accessory capable of serving as a hunting blind, game drag, and other functions as well.

It is another object of the invention to provide such a hunting accessory comprising a pair of essentially identical shells, with one shell being removably and hingedly attached to the other for inversion thereover to form a closed blind or container.

It is a further object of the invention to provide such a hunting accessory in which at least one shell includes a closed bottom surface devoid of lateral protrusions, and wherein one shell may be separated from the other for use as a game drag, equipment sled, or the like.

Still another object of the invention is to provide such a hunting accessory in which at least one shell is buoyant for use in water or marshy and swampy areas.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
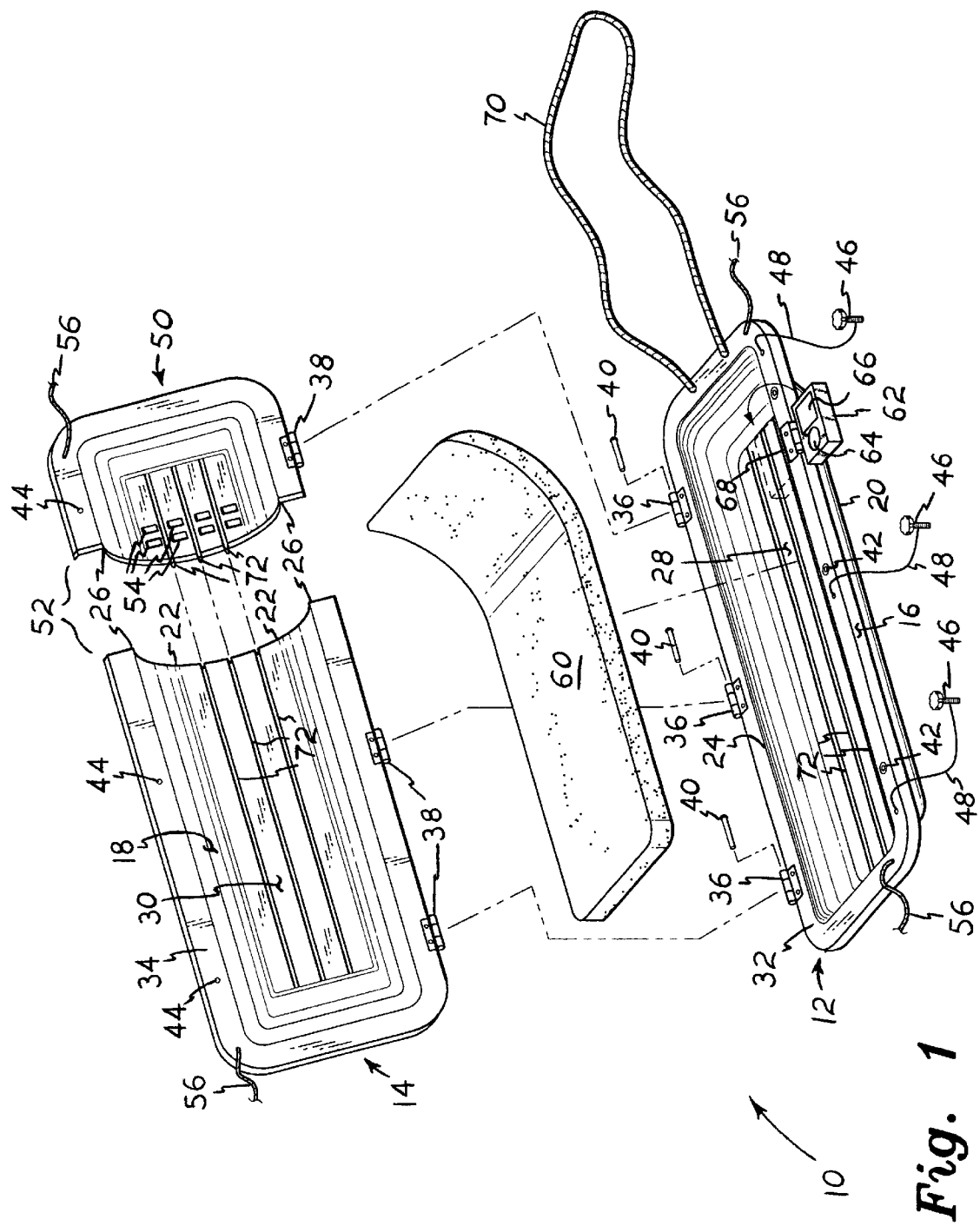
FIG. 1 is an exploded perspective view of a hunting accessory according to the present invention, showing various details thereof.

The present invention comprises a hunting accessory, which may be used as a closed blind for concealment of a hunter, as a game drag or tote, and/or for other purposes as well. FIG. 1 of the drawings provides an exploded perspective view of the various components of the present hunting accessory 10, and also shows their relationship to one another. The present hunting accessory 10 essentially comprises a first or lower shell 12 and an essentially identical second or upper shell 14. Each of the shells 12 and 14 is in the general form of an elongate, open tub with a surrounding side wall, respectively 16 and 18, with a first edge, respectively 20 and 22, and an opposite second edge, respectively 24 and 26 for the first and second shells 12 and 14. Each of the first edges 20 and 22 has a panel extending thereacross, respectively indicated as panels 28 and 30, with the opposite second edges 24 and 26 each having an outwardly extending peripheral flange, respectively 32 and 34 for the first and second shells 12 and 14, extending therefrom.

The above described shells 12 and 14 will be seen to define a tub-like structure, with their closure panels extending across one edge of their respective walls, with the opposite wall edges being surrounded by flanges and defining open areas therein. It will be seen that in order to use either of the shells 12 or 14 as a container or tub, the first wall edge (20 or 22) must be oriented downwardly, with the panel 28 or 30 extending across those wall edges being oriented at the bottom of the respective shell 12 or 14. However, by inverting one of the shells, e.g. the second shell 14, it may be used as a lid or cover for the first shell 12 and its contents (concealed hunter, equipment, etc.).

Accordingly, the two flanges 32 and 34 of the two shells 12 and 14 may be removably secured together by means of a series of hinges, with the first shell 12 having first hinge leaves 36 attached to the flange 32 thereof and the second shell 14 having second hinge leaves 38 attached to the flange 34 thereof. The cooperating hinge leaves 36 and 38 may be releasably connected by means of a corresponding series of hinge pins 40. The pins 40 may be captured and secured to one or the other of the shells 12 or 14 by retaining cables, as used for securing other fasteners and fittings to one of the shells 12 or 14 of the present hunting accessory and discussed further below.

The hinge assemblies comprising components 36 through 40 serve to secure one side or edge of the two flanges 32 and 34 of the two shells 12 and 14 together. However, additional fastener means is required to hold the opposite edges of the two shells 12 and 14 together, if the present hunting accessory 10 is to be used as a closed container for some purpose. Accordingly, a series of threaded inserts 42 is installed along the first shell 12 flange edge 32, opposite the side having the hinge leaves 36 secured thereto. Fastener passages 44 are provided in the corresponding edge of the second shell flange 34. A series of hand operable threaded fasteners 46 (e.g., threaded studs with hand operable knobs) are provided for securing the corresponding flange edges together, with each of the fasteners 46 being tethered to the first shell 12 by a tether line 48 to prevent their loss. Alternatively, other means may be used to secure the two shell flanges together as desired, e.g., unthreaded pins with wire retaining bales which may be looped over the smaller diameter end of the pin after it has been inserted through the two flange holes, as disclosed in U.S. Pat. No. 6,016,823 to Hill (FIG. 9, component no. 42 of the Hill '823 patent), incorporated herein by reference.

Figure 2:
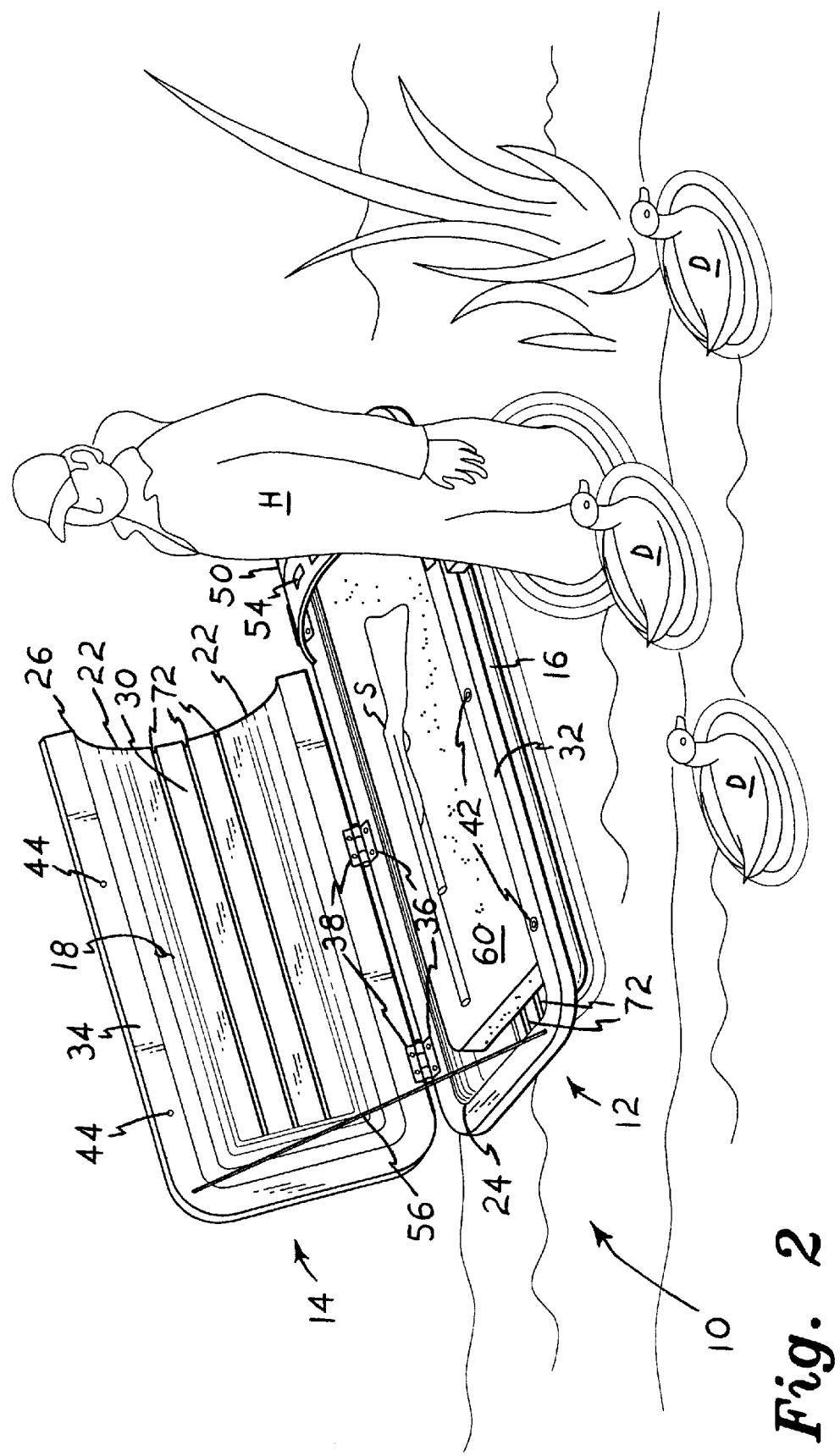
FIG. 2 is an environmental perspective view of the present hunting accessory, showing its use as a storage container with a hunter deploying decoys therefrom.

Preferably, the tub structure of at least the first shell 12 forms a solid, unbroken, buoyant, liquid tight hull which is devoid of any openings or passages therethrough. This enables the first shell structure 12 to be used as a raft, skiff, or floating blind, generally as shown in FIG. 2 of the drawings, where the hunter H is using the assembly 10 to carry decoys D for deployment in a marshy area, as well as for the carriage and flotation of other hunting gear (e.g., a shotgun S, etc.) as desired. A waterproof material, e.g., a heavy grade of polyethylene plastic, etc., serves well for the manufacture of the present invention.

Figure 3:
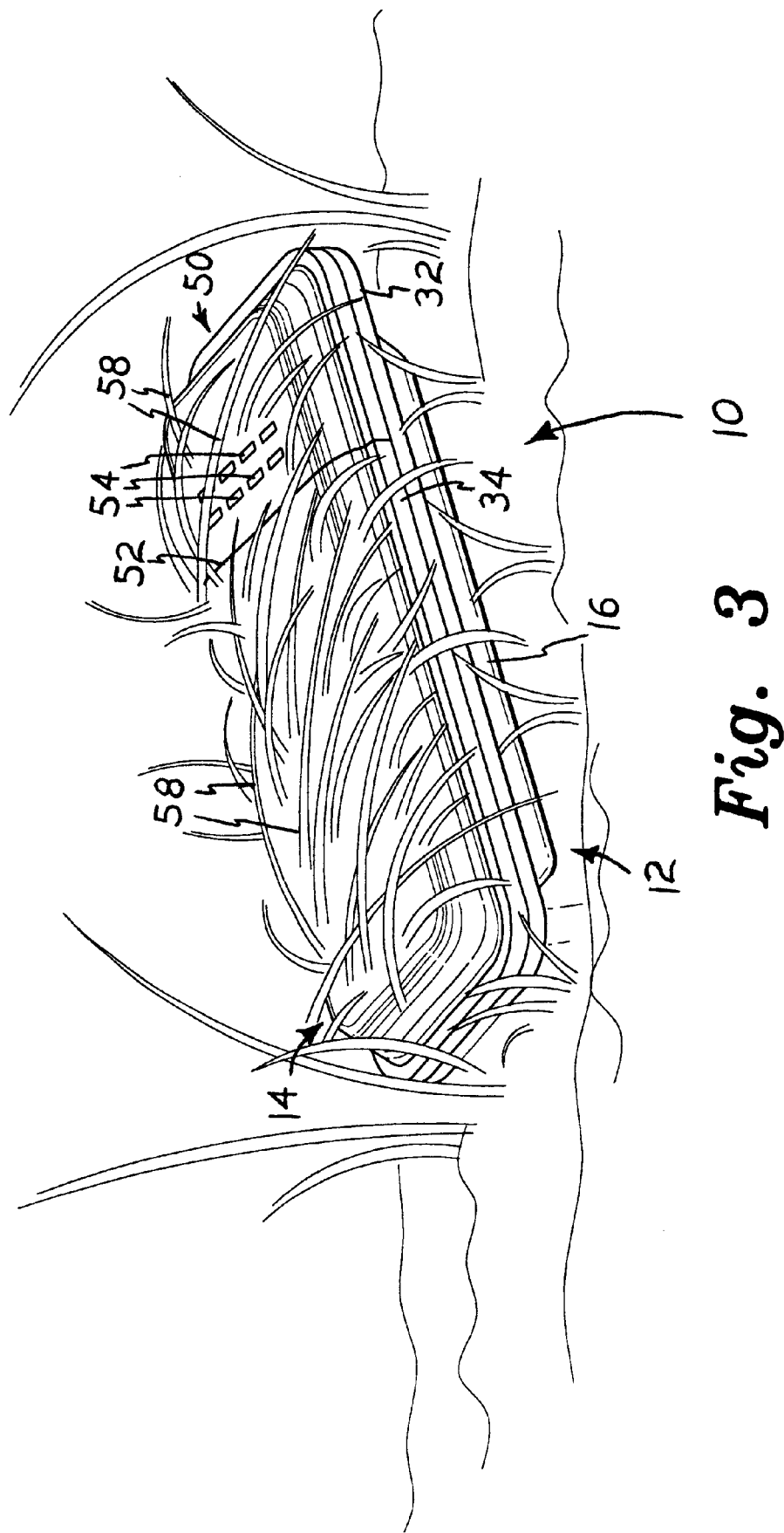
FIG. 3 is an environmental perspective view of the present hunting accessory deployed for use as a blind, with camouflage material installed thereover.
Figure 4:
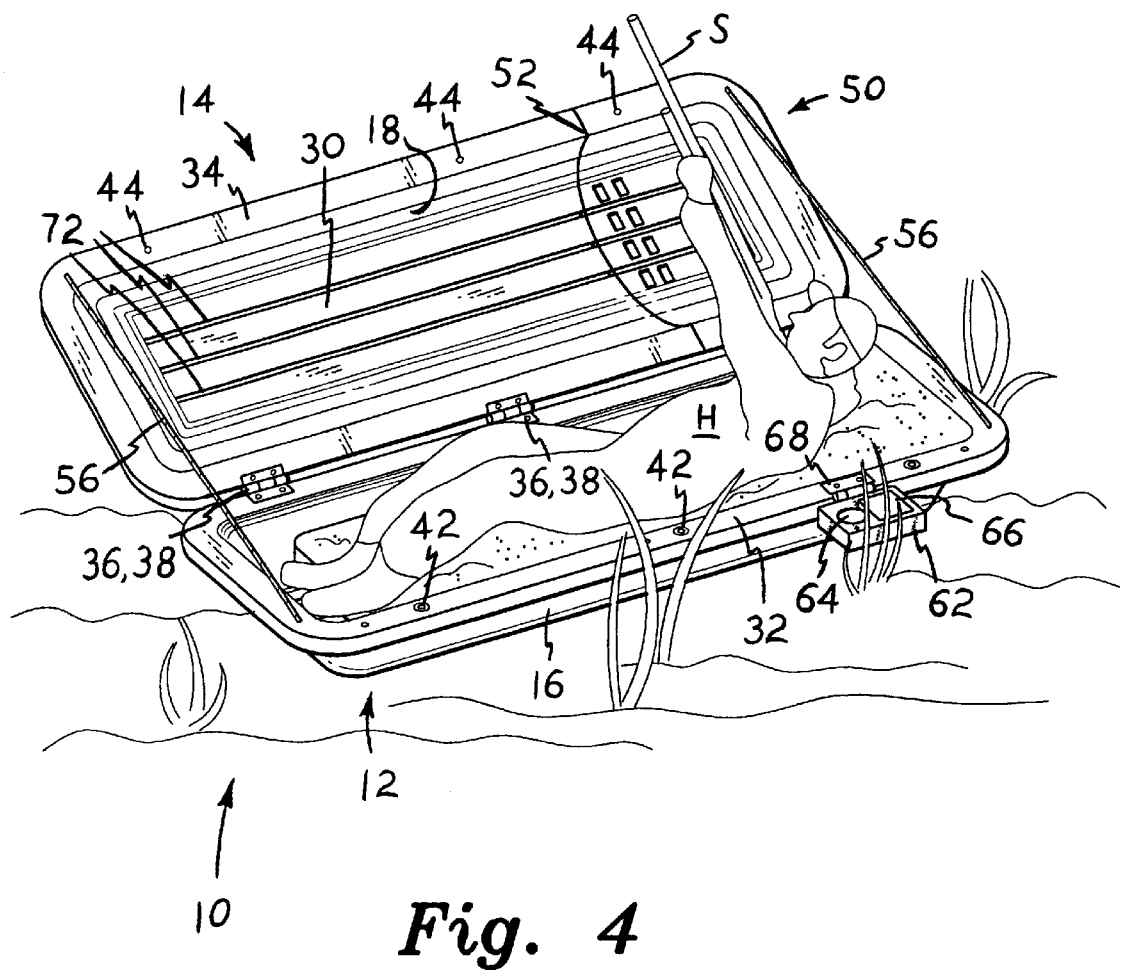
FIG. 4 is an environmental perspective view of the hunting accessory with the upper portion opened, allowing the hunter therein to shoot therefrom.

The two shells 12 and 14 each comprise elongate structures having lengths sufficient for at least an average adult male to recline therein in an essentially supine position. This allows the present hunting accessory to be used as a waterfowl blind or the like, generally as indicated in FIGS. 3 and 4 of the drawings. The waterproof construction of at least the first or lower shell 12, enables the hunter H to deploy the present hunting accessory in wet, marshy, and/or swampy areas with assurance that the interior of the device will remain dry and that at least the first shell portion 12 will remain buoyant and will not take on water.

It will be noted in the drawings, particularly in FIG. 1, that the second shell portion 14 may be divided into two portions, with a smaller portion designated as second shell component 50. As noted further above, the two shells 12 and 14 are preferably former from identical molds, to reduce manufacturing costs. However, the second shell 14 may be easily modified at the time of manufacture or by the purchaser, for additional versatility if so desired. By cutting the second shell component 50 from the majority portion of the second shell 14, a separate openable lid is provided, separated from the main portion of the second shell 14 by a lateral split 52 (exaggerated in FIG. 1 due to the exploded nature of the drawing). The main portion of the second shell 14 is larger than the lid portion 50, and is dimensioned to fit over the legs and trunk of hunter H lying therein. The smaller lid portion 50 covers the shoulders and head of the hunter H therein, when the two upper shell components 14 and 50 are closed over the lower shell 12.

The relative positions of the above described upper shell components 14 and 50 over a supine hunter H therein, may be visualized in FIG. 4 of the drawings, with the two upper shell components 14 and 50 being opened for the hunter H to take a shot. It will be seen that the two upper shell portions 14 and 50 are independently openable and closable relative to one another. The hunter H need only open the smaller upper shell portion 50 in order to make a shot, if so desired, depending upon clearance needed to swing the gun, other obstructions in the area, etc.

A series of viewing and/or ventilation ports or holes 54 may be provided through the panel 30 of the second shell 14, located over the face and eyes of a hunter H reclining within the closed accessory 10 when it is used as a hunting blind. While these viewing ports or passages 54 are shown in the separate smaller second portion 50 of the second shell 14, it should be noted that they are not necessarily required where the second shell is separated into two separate components 14 and 50, as the hunter H may leave the smaller second shell component 50 open while leaving the larger second shell portion closed. These viewing and/or ventilation ports or passages 54 may be cut or otherwise formed through the otherwise solid wall of the panel portion of the smaller second portion 50 of the second shell 14 at the time of manufacture, or the two shells 12 and 14 may be supplied to the end user for modification by forming the viewing ports 54 and/or cutting the second shell to form two separate components as indicated herein, or in some other way as desired.

The second or upper shell portion 14 (and its smaller portion 50) are removably secured to the lower shell portion 12 by means of the hinge components 36 through 40, as described further above. When the second shell components 14 and 50 are secured to the first shell portion 12, some means may be provided to prevent the second or upper shell components 14 and 50 from swinging open too far, and support the upper shell components 14 and 50 above the underlying surface. The second shell opening limit means may comprise elastic bungee cords, ropes or cables 56, as shown in FIGS. 1, 2, and 4, or may comprise some other opening stop means as desired. This precludes contact of the second shell components 14 and 50 with any wet or marshy areas, and serves to keep them dry.

This can be an important consideration, when camouflage material 58 is used to cover and/or conceal at least the second or upper shell portions 14 and 50, as shown in FIG. 3 of the drawings. The hunter may use natural materials available in the field (e.g., cat tails and other reeds and rushes, wild rice, etc.) and/or may use such commercially available camouflage materials as "Real Grass" (tm) and "Fast Grass" (tm), as desired. Conventional elastic bungee cords (not shown) may be removably extended over the top of the second shell portions 14 and 50 and hooked to the corresponding flange edges 34 on each side, and/or to the fastener holes 44, as desired, with the camouflage material 58 being tucked beneath the bungee straps for temporary and removable installation upon the second shell portions 14 and 50 as desired.

The present hunting accessory 10 may also include means providing for the comfort and convenience of the hunter H or other user of the device, as desired. For example, the hunter H or other user of the present hunting accessory 10 may place a cushion 60 or the like within the first or lower shell portion 12, if so desired, for comfort when using the accessory 10 as a hunting blind, as shown in FIGS. 3 and 4. The cushion 60 is visible in the open blind configuration shown in FIG. 4 and in other drawing Figs.

The present accessory 10 may also include an accessory tray 62 secured to the flange 32 of the first shell 12, adjacent the location of the head and/or upper body of a hunter H when he is positioned within the lower shell 12. The accessory tray 62 may include a cup holder portion 64 and/or other receptacle 66 for holding shotgun shells, a bird call, etc., as desired. The accessory tray 62 may be secured to the first shell flange 32 by a hinge assembly 68, allowing the tray 62 to be folded over into the interior of the closed hunting accessory 10 for transportation and/or storage of the device, to preclude damage to the tray 62 during handling of the assembly 10.

To this point, the present hunting accessory 10 has been described as a waterfowl hunting blind. However, it will be seen that the present hunting accessory 10 provides considerably greater versatility, and may be used in many other ways and for many other purposes, both in hunting and in other than hunting activities.

Figure 5:
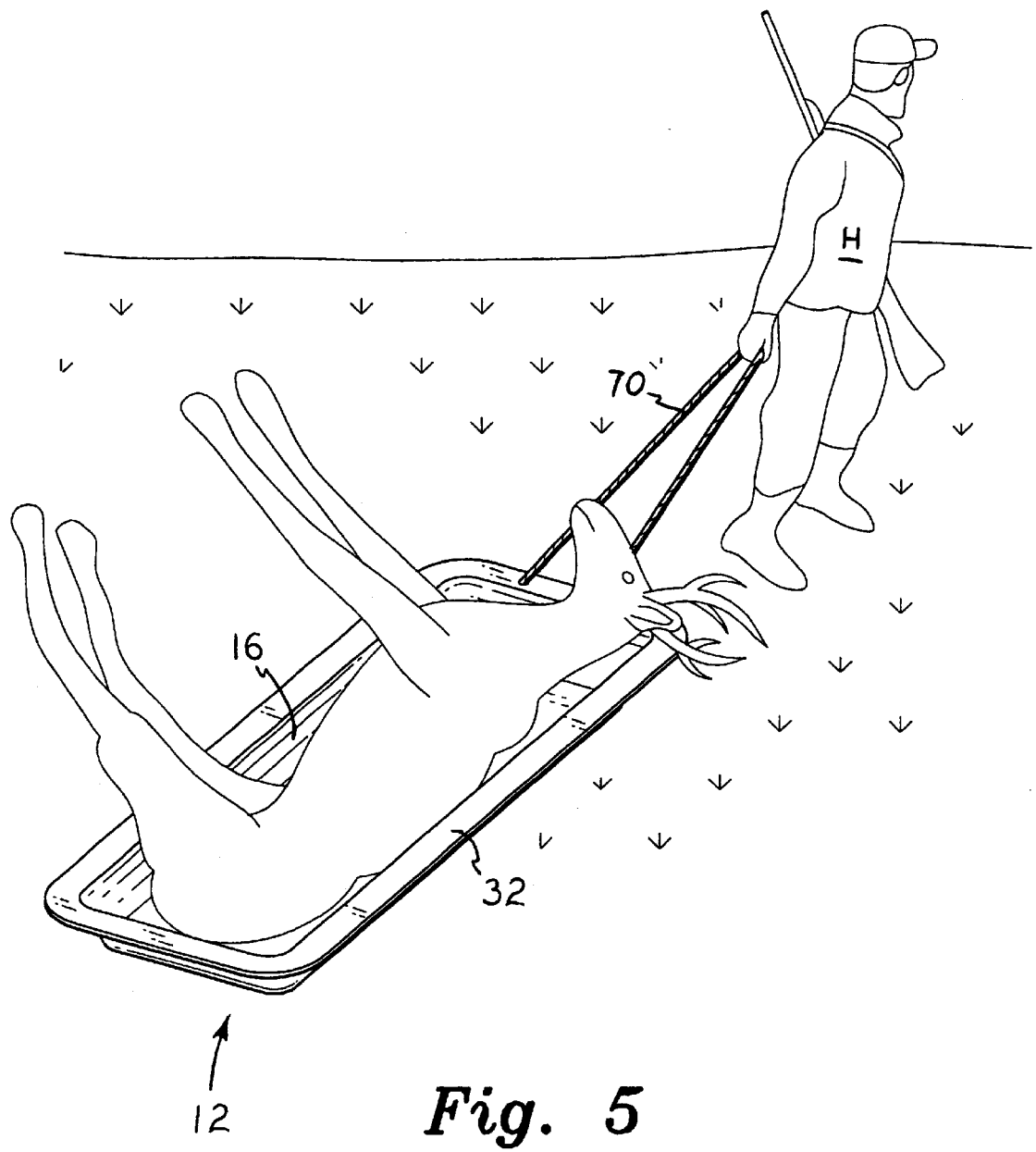
FIG. 5 is an environmental perspective showing a single one of the shell components in use as a game drag.

For example, FIG. 5 of the drawings illustrates the use of the first or lower shell portion 12 as a game tote or game drag. In FIG. 5, the second shell component(s) 14 (and 50, if cut from the primary second shell 14 as a separate component) have been removed from the first shell 12. This is easily accomplished, by merely pulling the hinge pins 40 from the hinge leaves 36 and 38 of the respective first and second shell flanges 32 and 34, and removing the second shell retaining lines 56 from the first shell flange 32. The accessory tray 62 may be folded inwardly to rest within the interior of the shell 12, or may be removed by pulling the hinge pin in a similar manner to that used for separating the second shell 14 from the first shell 12. (The various hinge leaves 36, fastener inserts 42, etc., are not shown in FIG. 5, for clarity in the drawing Fig.)

The use of the first shell portion 12 as a game tote is facilitated by the installation of a tow rope or line 70 removably attached to one end thereof (e.g., tied through conventional holes or passages, etc.), as shown in FIG. 5 of the drawings. The first shell 12 may be towed or pulled by hand, or behind an all terrain vehicle, snowmobile, boat, etc. as desired, depending upon the underlying surface. Guidance of the shell 12 over a relatively soft surface is further facilitated by the provision of one or more longitudinal ribs 72 (shown in FIGS. 1, 2, and 4), which limit lateral movement of the shell 12 (or second shell 14, if inverted and used in the same manner) when towed or pulled over a soft surface.

In conclusion, the present hunting accessory 10 provides outstanding versatility in a single piece of equipment, for use by a hunter and/or outdoorsman. The present invention works well as an easily portable single or two person blind, with a single person having complete concealment by means of the second shell portion which may be hingedly closed over the first shell portion. Alternatively, a second person may utilize the second shell, in much the same manner as that shown in FIG. 4 for a single hunter reclining within the first shell, if an open blind or shooting location is all that is necessary.

The polyethylene plastic material of which the present hunting accessory is preferably formed, provides a tough, durable structure for the device. It is also waterproof, which greatly increases comfort for the hunter when the device is deployed in wet or marshy areas. The waterproof property of the material enables it to be used as a boat or raft, for floating a hunter and/or his equipment to a hunting site in a pond or other body of water.

When the two shells are separated from one another, the device may enjoy additional utility as a game or equipment tote or drag. The device is sufficiently light weight to permit towing or pulling by hand, or it may be towed behind a mechanized vehicle as desired. Since the material is waterproof and has a smooth surface, it is easily washed out after use as a deer drag, or after carrying or holding any materials which might soil the interior of the device.

As the device may be used to form a closed container by means of its two main shell portions, it is also useful in hauling other light weight materials (e.g., leaves, sand, yard waste, etc.) which might blow out of an open container during transport in an open vehicle. The ability to quickly and easily close and fasten the shells together, assures that any contents therein cannot escape. By securing the two shells together with a padlock or the like through the fastener holes in the mating flanges, the contents (firearms and other hunting equipment, etc.) can be safely secured when transported in an open vehicle, such as a pickup truck, etc.

The present hunting accessory is sufficiently small as to fit easily in the bed of a standard pickup truck, or even in the back of a van or sport utility vehicle, etc. The present accessory greatly adds to the versatility of such enclosed vehicles, by enabling the interiors to be kept neat and clean while the accessory is used for carrying materials which might otherwise soil the interior of the vehicle. The present hunting accessory will thus find great favor among hunters, outdoorsmen, and others who have need for an extremely versatile, durable, and low maintenance device for use as a blind, game tote, and/or cargo and equipment carrier.

It is to be understood that the present invention is not limited to the embodiments described above, but encompasses any and all embodiments within the scope of the following claims.

I claim:

1. A hunting accessory comprising:

a first shell and a second shell;

each said shell having a generally identical configuration to one another and comprising an elongate, open tub having a surrounding side wall;

each said side wall having a first edge and a second edge opposite said first edge;

said first edge of each said side wall having a panel extending thereacross;

said second edge of each said side wall further including a peripheral flange disposed therearound;

hinge means removably securing said flange of said first shell to said flange of said second shell;

said side wall and said panel of at least said first shell further comprising a solid, unbroken, buoyant, liquid tight hull devoid of openings and passages therethrough, and dimensioned and configured for closely containing a single person in a generally supine position therein;

said second shell comprises a first portion and a second portion separated from one another by a lateral split;

said first portion being larger than said second portion;

each said portion being removably secured to said first shell by said hinge means;

each said portion being independently openable and closable relative to one another from said first shell;

said first portion being disposed generally above the legs and trunk of the person when a person is contained therein; and said second portion being disposed generally above the shoulders and head of the person when the person is contained therein.

2. The hunting accessory according to claim 1, further including at least one viewing and ventilation passage disposed through said second portion of said second shell.

3. The hunting accessory according to claim 1, further including at least one longitudinally disposed rib formed along said panel of each said shell.

4. The hunting accessory according to claim 1, further including means for temporarily holding each said shell together in a closed configuration as desired.

5. The hunting accessory according to claim 1, further including cushion means disposed in at least said first shell.

6. The hunting accessory according to claim 1, further including camouflage material removably secured thereto.

7. The hunting accessory according to claim 1, further including an accessory tray hingedly secured to said first shell.

8. The hunting accessory according to claim 1, further including a tow rope removably secured to said first shell.

9. The hunting accessory according to claim 1, wherein said first shell and said second shell are formed of polyethylene plastic.

10. A hunting accessory comprising:

a first shell comprising an elongate, open tub having a surrounding side wall;

said side wall having a first edge and a second edge opposite said first edge;

said first edge of said side wall having a panel extending thereacross;

said second edge of said side wall further including a peripheral flange disposed therearound;

said side wall and said panel of said first shell further comprising a solid, unbroken, buoyant, liquid tight hull devoid of openings and passages therethrough, and dimensioned and configured for closely containing a single person in a generally supine position therein;

said second shell comprises a first portion and a second portion separated from one another by a lateral split;

said first portion being larger than said second portion;

each said portion being removably secured to said first shell by said hinge means;

each said portion being independently openable and closable relative to one another from said first shell;

said first portion being disposed generally above the legs and trunk of the person when a person is contained therein; and said second portion being disposed generally above the shoulders and head of the person when the person is contained therein.

11. The hunting accessory according to claim 10, further including:

an accessory tray hingedly secured to said first shell; and a tow rope removably secured to said first shell.

12. The hunting accessory according to claim 11, further including at least one longitudinally disposed rib formed along said panel of each said shell.

13. The hunting accessory according to claim 11, further including means for temporarily holding each said shell together in a closed configuration as desired.

14. The hunting accessory according to claim 11, further including cushion means disposed in at least said first shell.

15. The hunting accessory according to claim 11, further including camouflage material removably secured thereto.

16. The hunting accessory according to claim 11, wherein said first shell and said second shell are formed of polyethylene plastic.

17. The hunting accessory according to claim 10, further including:

a second shell having a generally identical configuration to said first shell; and hinge means removably securing said flange of said first shell to said flange of said second shell.

18. The hunting accessory according to claim 10, further including at least one viewing and ventilation passage disposed through said second portion of said second shell.

* * * * *